UNITED STATES PATENT OFFICE.

MARTIN HERZBERG AND FRIEDRICH RUNKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN AZO DYE.

953,033. Specification of Letters Patent. Patented Mar. 29, 1910.

No Drawing. Application filed August 14, 1909. Serial No. 512,891.

*To all whom it may concern:*

Be it known that we, MARTIN HERZBERG and FRIEDRICH RUNKEL, doctors of philosophy, chemists, citizens of the German Empire, residing at Elberfeld, Germany, have invented new and useful Improvements in Azo Dyes, of which the following is a specification.

Our invention relates to the manufacture and production of new azo dyes which can be obtained by combining in alkaline solution the diazo compounds of sulfonic acids of aminophenylethers or their derivatives with a substituted 2-amino-8-naphthol-6-sulfonic acid containing in the amino group an aryl or an aralkyl, such as phenyl, tolyl, benzyl etc. of the formula:

R standing for an aryl or aralkyl radical.

The new dyestuffs are after being dried and pulverized in the shape of their sodium salts dark powders soluble in water with a brown to brownish-red color. Upon reduction with stannous chlorid and hydrochloric acid they are decomposed, and aminophenylether sulfonic acid and a diaminonaphthol sulfonic acid of the formula:

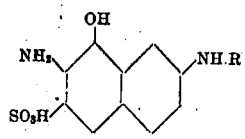

being thus obtained.

The new coloring matters dye wool from acid baths brown shades remarkable for their fastness to washing and to milling.

In order to carry out our process we can e. g. proceed as follows, the parts being by weight: 30 parts of ortho-amino-para-chlorophenylether sulfonic acid are dissolved in hot water with the addition of 6 parts of anhydrous sodium carbonate. 7 parts of sodium nitrite are added and the mixture is introduced into cold water containing 40 parts of crude hydrochloric acid. The diazo compound is introduced into a cold aqueous solution of 31.5 parts of 2-phenylamino-8-naphthol-6-sulfonic acid containing an excess of sodium carbonate. The dyestuff which precipitates is filtered off, washed and dried. It is after being dried and pulverized in the shape of its sodium salt a dark powder soluble in water with a reddish-brown color and soluble in concentrated sulfuric acid with a violet color. Upon reduction with stannous chlorid and hydrochloric acid the new dye is decomposed, ortho-amino-para-chloro-phenylether sulfonic acid and 7-amino-2-phenylamino-8-naphthol-6-sulfonic acid being thus obtained.

The new dyestuff dyes wool brown shades fast to washing and to milling.

The process is carried out in an analogous manner for the production of other of the above mentioned dyestuffs e. g. from 2-tolylamino-8-naphthol-6-sulfonic acid, 2-benzylamino-8-naphthol-6-sulfonic acid etc. and other aminophenylether sulfonic acids, e. g. para- or ortho-aminophenylether sulfonic acid, ortho-amino-para¹-chlorophenylether sulfonic acid, ortho-amino-para-chloro-phenyl-para¹-tolylether sulfonic acid etc. One can also start from ethers containing no sulfonic groups and sulfonate the dyes.

We claim:

1. The herein described new azo dyestuffs obtainable from a diazotized aminophenylether sulfonic acid and a substituted 2-amino-8-naphthol-6-sulfonic acid of the above given formula, which are after being dried and pulverized in the shape of their sodium salts dark powders soluble in water with a brown to reddish-brown color; yielding upon reduction with stannous chlorid and hydrochloric acid an aminophenylether sulfonic acid and a diaminonaphthol sulfonic acid of the above given formula; and dyeing wool from acid baths brown shades remarkable for their fastness to washing and to milling, substantially as described.

2. The herein described new azo dyestuff obtainable from diazotized ortho-amino-para-chloro-phenylether sulfonic acid and 2-phenylamino-8-naphthol-6-sulfonic acid, which dye is after being dried and pulverized in the shape of its sodium salt a dark powder soluble in water with a reddish-brown color and soluble in concentrated sulfuric acid with a violet color; yielding upon reduction with stannous chlorid and hydrochloric acid ortho-amino-para-chloro-phenyl-ether sulfonic acid and 7-amino-2-phenylamino-8-naphthol-6-sulfonic acid; and dyeing wool brown shades remarkable for their fastness to washing and to milling, substantially as described.

In testimony whereof we have hereunto set our hands in the presence of two subscribing witnesses.

MARTIN HERZBERG. [L. S.]
FRIEDRICH RUNKEL. [L. S.]

Witnesses:
OTTO KÖNIG,
WILLY KLEIN.